United States Patent Office

2,875,040
Patented Feb. 24, 1959

2,875,040

PROCESS OF SEPARATING PALLADIUM FROM METALS OF THE PLATINUM GROUP

Silvio Barabas, Montreal, Quebec, Canada, assignor to Canadian Copper Refiners Limited, Toronto, Ontario, Canada, a corporation of Canada No Drawing. Application February 4, 1958
Serial No. 713,086

13 Claims. (Cl. 75—121)

The present invention relates to a process of separating palladium from the metals of the platinum group, i. e. platinum, rhodium and iridium, which process is simpler, quicker and more efficient than processes effective for this purpose and heretofore known.

It often happens in the refining of ores containing various of the precious metals, that there will be present not only palladium, but also one or more metals of the platinum group consisting of platinum, rhodium and/or iridium as aforesaid. A conventional procedure heretofore known has been first to separate from these metals the gold and silver which may be present, leaving the metals in question in a highly acid solution, usually comprising hydrochloric acid, and usually quite strongly saturated with sulphur dioxide (which has been used conventionally to precipitate the gold from the solution). Residual silver may be or may have been separated from solutions of this kind by a sufficient dilution so that silver chloride will precipitate out, it being recognized that silver chloride is more or less soluble in strongly acid solutions wherein the acid is hydrochloric acid, while being quite insoluble in dilute solutions thereof and/or in water.

A conventional way of treating these solutions has been to precipitate the platinum therefrom as ammonium chloroplatinate, $(NH_4)_2PtCl_6$, by adding ammonium chloride. Palladium is subsequently precipitated as palladium diammine chloride, $PdCl_2 \cdot 2NH_3$. The platinum and palladium precipitates are thereafter and separately ignited to produce platinum and palladium sponge. These precipitations of platinum and palladium leave much to be desired, as it is almost impossible practically to secure these several precipitations in a manner so as completely to separate the metals in question. Another difficulty is the relatively high solubility of ammonium chloroplatinate at room temperature. As a practical matter it is found that the ammonium chloroplatinate precipitated under these circumstances and in the presence of palladium is usually contaminated with palladium; while the palladium diammine chloride precipitate is correspondingly heavily contaminated with platinum. There is also the tendency for occlusion.

The process of the present invention comprises the step of precipitating palladium as a bivalent iodide $(PdI_2)$. While various compounds of palladium and iodine have been known, it has never been known heretofore how to precipitate palladium substantially quantitatively as $PdI_2$, while preventing the partial solution of this precipitate in accordance with the equation:

$$PdI_2 + 2I^- = PdI_4^=$$

It is known, for instance, that some compounds capable of producing in solution the radical $PdI_4^=$ are soluble, such as the potassium salt of this negative radical. It is also known, for example, that platinum may be precipitated by the addition of a soluble iodide in aqueous solution as $PtI_4$. This precipitation must also be repressed in order to attain a desired selectivity as between palladium and platinum.

The present invention provides a practical method of overcoming these difficulties and particularly teaches the conditions under which palladium may be precipitated quantitatively as $PdI_2$, while substantially completely preventing resolution of the palladium precipitate, and while at least repressing, and in some instances wholly preventing, the precipitation of other metals of the platinum group as aforesaid as the corresponding iodides. Briefly, these conditions comprise the maintenance in the aqueous solution of a sufficient concentration of sulphur dioxide so as to attain these desired results.

From a more specific point of view, it is found in accordance with this invention that the solution in which the precipitation of $PdI_2$ is to be carried on should be on the acid side of neutral due to the presence in the solution of at least one of the strong acids, such as hydrochloric, nitric and/or sulphuric acids; but that it should be substantially free of (a) nitric acid containing a small amount of hydrochloric acid, and (b) aqua regia.

Mixtures of nitric and hydrochloric acids in general cannot be used in accordance with this invention as such mixtures constitute aqua regia, which is effective to dissolve both palladium and platinum and which prevents the desired selective precipitation in accordance with the present invention. Other mixtures of acids, not including both hydrochloric and nitric, are usable; although either a mixture of principally hydrochloric acid with a small amount of nitric acid or a mixture of principally nitric acid with a small amount of hydrochloric acid is usable if sufficient additional sulphur dioxide is used over and above that which is normally required to achieve the desired results.

It has also been determined as a specific feature of the present invention that the concentrations of sulphur dioxide required to attain the desired results are at least 0.3 gram per liter, and particularly up to about 4 grams per liter, with the preferred concentration of sulphur dioxide in the range of about 1 to about 3 grams per liter.

It has also been determined that while it is not inoperative to add an excess of a soluble iodide as a precipitant, it is better practice as well as more economical to add about the stoichiometric amount thereof necessary to react with the palladium present to form $PdI_2$, as any substantial excess of iodide tends to make more possible the solution of some of the palladium precipitate as aforesaid; and also the iodine liberated by the presence of an excess amount of iodide can act to oxidize some of the sulphur dioxide and thereby reduce the sulphur dioxide concentration below the necessary minimum concentration required.

It is found that when the ratio of palladium to platinum in the starting material is at least about 4:1, a single precipitation as aforesaid will result in the substantially quantitative precipitation of the palladium present, while the amount of platinum metals present in the precipitate will not exceed trace amounts. If, on the other hand, the initial solution used as a starting material is relatively higher in one or more of the platinum metals other than palladium and hence containing a smaller proportion of palladium, then a second and possibly a third precipitation may be required. For example, when the ratio of palladium to platinum in the starting metal is as little as 1:1 and substantially less than 4:1, then a second precipitation is generally required.

The second or a subsequent precipitation is accomplished practically by separating and igniting the first precipitate, which will contain all the palladium initially present in the form of $PdI_2$ and some substantial amount or amounts of one or more other platinum metals as the corresponding iodides. This precipitate is ignited to drive off the iodine and to reduce the several metals to their elemental states as a sponge. This metallic sponge material is then treated with aqua regia, which is effective to dissolve the platinum and the palladium, while leaving any rhodium and iridium present undissolved. The solution may then be separated from any remaining solid material and treated to eliminate the nitric acid therefrom, preferably by alternatively reducing the volume thereof by evaporation and taking up the remaining material in hydrochloric acid. The resulting solution in hydrochloric acid is then supplied with a sufficient concentration of sulphur dioxide and the precipitation step repeated as aforesaid.

When the initial ratio of palladium to platinum is less than about 1:1 and down to about 1:19, for example, a second reprecipitation (three in all) is generally required to effect a substantially quantitative separation; while still lesser proportions of palladium may require additional reprecipitations.

From a practical point of view, it is found that the addition of a soluble iodide used in this case as a precipitant may be carried on substantially as a titration, the materials present acting in and of themselves to provide a visible end point when about the stoichiometric amount of soluble iodide is added. Thus the starting solution usually is rather dark red in color, this color disappearing completely at the end point and the solution then being from colorless to a light green.

Attempts have been made by the prior art to use ferrous sulphate in solution to attain results similar to what is now found to be obtainable by the use of a sufficient amount of sulphur dioxide. The use of ferrous sulphate in this way has been found relatively undesirable and practically unsuitable as a substitute for sulphur dioxide by reason of the fact that the precipitation of palladium as $PdI_2$ proceeds very slowly and the end point is difficult and sometimes almost impossible to detect.

The process is further illustrated by a number of actual examples in most of which the solution used was one simulating in composition the electrolyte from gold cells used for refining the gold found in ore which also contained palladium and platinum. In this electrolyte, rhodium and iridium were present only in trace amounts, so that additional tests were run using other compositions containing rhodium and iridium as more specifically hereinafter set out.

Example I

This example is intended to demonstrate the general operation of the process as applied to the recovery of palladium and platinum from an electrolyte solution from a cell from which gold was purified by electrolysis, the electrolyte first containing a substantial amount of gold as gold chloride. This gold is first separated by saturating the solution with sulphur dioxide, usually by bubbling this gas through the solution. This results in reducing the gold to its elemental state as a solid material, which may then be separated as such from the remaining solution.

In the particular test under consideration the solution obtained in this manner was unusually high in palladium, containing about 68.8 grams of palladium per liter and 9.68 grams of platinum per liter. A 10-ml. sample of this solution was pipetted into a glass vessel, diluted to 100 ml. and a 10% potassium iodide solution was added dropwise until no more palladium iodide precipitate was formed. The total volume of 10% KI solution added was 22 ml., which was in very good agreement with the theoretical amount of 21.4 ml. (considering that the KI solution was prepared, using only a relatively rough balance). The resultant slurry was then boiled and the coagulated palladium iodide precipitate allowed to settle. After filtering the precipitate from the remaining solution and washing it a few times with dilute hydrochloric acid (1:9) and with hot distilled water, the precipitate was wrapped in filter paper and placed in a porcelain casserole. The paper was first charred at low temperature and the iodine expelled, and then ignited at a higher temperature. The palladium metal remaining was then ground in a mortar, then placed in a porcelain boat and ignited again in a current of hydrogen. The purity of the palladium obtained by this treatment was good, considering that most other metals were either completely absent or present only in trace quantities. The palladium thus produced was examined by spectrographic analysis methods, with the result that platinum and copper were found to be present in trace amounts only, and silver apparently in something more than a trace amount. This last, however, was interpreted to mean little, since silver has a very low spectrographic detection limit.

The same procedure was repeated and the palladium obtained redissolved in aqua regia and later reprecipitated in some instances as $PdI_2$ and in others as $PdCl_2.2NH_3$ and thereafter reduced to metallic palladium. The palladium thus produced was found to be as pure as first quality palladium which is commercially available.

The same tests were carried through on a somewhat larger scale with no change except those necessarily incident to the larger scale operation and a further step performed before the elimination of gold as aforesaid for eliminating silver, which was accomplished by first diluting the gold electrolyte solution and simmering it under a low heat to coagulate any silver chloride present, which was then filtered out and separated using a close textured filter paper. The dilution to separate silver is due to the fact that it is known that silver chloride (AgCl) is substantially insoluble in water; while in a concentrated hydrochloric acid solution this otherwise insoluble material may be converted in part at least to one or another of the soluble complexes: $AgCl_2^-$, $AgCl_3^=$ or $AgCl_4^\equiv$. On dilution, these complexes dissociate and the silver chloride precipitates out.

The washing of the palladium precipitate as aforesaid with dilute hydrochloric acid is for the purpose of dissolving any cuprous iodide, which may be present if the original solution contained any substantial amount of copper. It is found that cuprous iodide is quite soluble in 0.1-N hydrochloric acid and may be removed from the precipitated palladium iodide at this point.

Platinum may be recovered from the filtrate following the precipitation of all the palladium as $PdI_2$ and the separation of this precipitate. For this purpose the filtrate may be treated with a metal such as aluminum or zinc, preferably the latter because of its faster reaction, so as to cement out the platinum, rhodium, and iridium as metals. The cementation mud may then be treated in aqua regia, which will dissolve the platinum and any aluminum or zinc remaining; while the rhodium and iridium remain behind as the metals and may be separated as such. The filtrate or solution from this separation may then be treated with ammonium chloride to precipitate the platinum as ammonium chloroplatinate, leaving the aluminum and/or zinc chloride in solution. This platinum compound may then be ignited to produce platinum metal in the conventional manner; and, if desired, the platinum may be further refined by redissolving it in aqua regia and reprecipitating it with ammonium chloride.

Example II

This example is given for the purpose of illustrating the effect of different amounts of sulphur dioxide in the solution and the requirements in this respect. In preparing for the series of tests set out in this example, it was decided to use a synthetic solution made up in the proportions in which the palladium and platinum occurred in the gold cell electrolytes experimented with in accordance with Example I, i. e. a 7:1 ratio by weight of palladium to platinum (both calculated as metals). To this end a synthetic solution was made up having 7 grams of palladium and 1 gram of platinum per liter, this solution further containing approximately 20% by volume hydrochloric acid, and the palladium and platinum being present therein as chlorides. This solution was used in all the tests set out in this example.

For the actual tests, five 10-ml. portions of the standard solution as aforesaid were placed in suitable beakers and heated to a temperature just under boiling (approximately 80° C.). To these beakers were added respectively 0, 1, 10, 20 and 40 drops of a saturated solution of sulphur dioxide in water, this solution averaging 56.5 grams of sulphur dioxide per liter at 27° C. (it is recognized that due to the volatility of sulphur dioxide, some of this gas may have vaporized due to the high temperature to which the mixed solutions were heated).

The palladium in the several beakers was then titrated with a 5% potassium iodide solution (accurately prepared as such). The precipitate of palladium iodide in each instance was washed six to eight times with hot 1-N hydrochloric acid and six to eight times subsequently with hot water and then transferred on to an ashless filter paper. This filter paper with its contained precipitate was folded, charred and placed in a porcelain casserole and the iodine removed therefrom by heat (ignition). The filtrate, after the separation of palladium precipitate, was cemented out by adding zinc dust in small quantities and until the supernatant liquid remained colorless. The solution was filtered and the cementation precipitate collected on an ashless filter paper, washed with 1-N sulphuric acid to dissolve and remove any zinc or copper present and finally with hot water. This paper with its contained platinum was charred and ignited. The resulting platinum sponge was redissolved in aqua regia, the nitric acid expelled by repeated treatment with hydrochloric acid to form a clear solution, and the platinum precipitated therefrom by the addition of ammonium chloride to give a bright yellow precipitate of the ammonium chloroplatinate crystals. This precipitate was filtered, washed with a 15–20% ammonium chloride solution and ignited to yield platinum metal. The palladium and platinum metals obtained as aforesaid were respectively weighed and subjected to spectrographic analysis.

In the absence of sulphur dioxide the dark red solution, No. 1, failed to clear up and the precipitate which formed bore no definite relation to the amount of the respective metals initially present. Furthermore, the separation of the metals was far from that desired.

When sufficient sulphur dioxide-saturated water solution was added as aforesaid, the original dark red colored solution became brighter and lighter in color, more or less in proportion to the sulphur dioxide concentration. Under these circumstances the end point of the titration with potassium iodide, which was very difficult to detect in solution No. 1, was relatively very easy to detect, even in solution No. 2, by a change in color of the solution from dark red to light green. In solutions Nos. 3, 4 and 5, the end point was indicated by the solution in each instance becoming substantially colorless (it is understood that the solutions were numbered in accordance with the amount of $SO_2$ solution added thereto, No. 1 having no $SO_2$; No. 2, one drop, etc.). The light green color of solution No. 2 at the end point turned gradually into dark red, particularly in the presence of an excess of potassium iodide, but was promptly decolorized upon the addition of a few more drops of the sulphur dioxide solution.

While the theories underlying the actions herein described are not complete and definite, it is believed that those theories as hereinafter set out will be helpful to an understanding of this invention. They are presented for this purpose and not by way of limitation. In accordance with the present hypothesis, platinum, after dissolution in aqua regia is present as tetravalent platinum, which reacts with potassium iodide to form a red complex, the exact composition of which is unknown. Sulphur dioxide reduces this tetravalent platinum to bivalent platinum, which does not form a colored complex. When there is a deficiency of sulphur dioxide in the solution, the tetravalent platinum may not be all reduced and/or some bivalent platinum may be oxidized by iodine liberated from the potassium iodide in the acid solution and result in a red coloration in the solution. Again, the addition of a sufficient amount of sulphur dioxide serves to destroy reddish color and convert it either to a colorless or a pale green colored liquid.

Calculating the respective concentrations of sulphur dioxide in the several solutions used in this example, from drops of saturated solution to percent by weight saturated solution, No. 2 solution (having one drop of sulphur dioxide) is believed to have a concentration of 0.5% saturated sulphur dioxide, which is approximately equivalent to 0.3 gram of sulphur dioxide per liter. The proportions in the other solutions may be similarly determined from the units given. On this basis it was concluded that, to accomplish the objects of the present invention there must be a minimum concentration of sulphur dioxide, in the solution being treated, of about 0.3 gram per liter, corresponding to the proportion in No. 2 solution. The maximum sulphur dioxide concentration is not critical, though at quite high concentrations of sulphur dioxide, the settling of the palladium iodide precipitate is retarded. In such a case the end point of the precipitation is not as readily detected. The preferred concentration is from about 1 to about 3 grams per liter.

In general, however, in view of the theories given above that the sulphur dioxide is effective to destroy the highly colored tetravalent platinum iodide complexes as such and to provide a relatively clear solution, it will be seen that the sulphur dioxide concentration is, to a certain extent at least, dependent upon the platinum concentration, so that in the treatment of solutions having relatively higher platinum concentrations, it is generally desirable to use relatively high sulphur dioxide concentrations.

As to the completeness of the separation between palladium and platinum, in solutions Nos. 2 and 3, spectrographic analysis indicated that the palladium contained merely a trace of platinum; while the results obtained from testing the palladium from solutions Nos. 4 and 5 indicated "barely visible" and "not detected" respectively as to platinum content.

*Example III*

This example is given to illustrate the effect of the use of ferrous ammonium sulphate in lieu of sulphur dioxide, inasmuch as it has been suggested that ferrous ammonium sulphate might be useful for this purpose.

In a series of tests conducted in a manner similar to those set out in Example II and using the same starting solutions of palladium and platinum, it was found that when ferrous ammonium sulphate was added to the starting solution in each instance, it would not serve to clear the dark red coloration at all. Upon the addition of the potassium iodide solution, a palladium iodide ($PdI_2$) precipitate formed, but remained in suspension, so that it was almost impossible to detect the end point. At any one stage in the titration with potassium iodide, it was found possible to boil the solution to cause the settling of the precipitate; but as soon as more potassium iodide was added and the solution stirred, the precipitate again remained in suspension and had to be boiled again to break the suspension and to cause the precipitate to settle. If this practical difficulty of repeated boilings and the time required for repeated settlings were to be overlooked, it was found that the palladium sponge obtained was of a purity comparable with that obtained in accordance with the procedure of the present invention set out in tests 2–5 of Example II. Thus the principal disadvantage of the use of ferrous ammonium sulphate in lieu of sulphur dioxide is that of detecting the end point accurately and promptly and the requirement for frequent boiling of the solution.

*Example IV*

This example is given to illustrate the effect of variations in hydrochloric acid concentrations, when this acid is the one present, and when the palladium and platinum are present as chlorides.

In this example a synthetic solution was made up as in Example II, which was first evaporated almost to dryness, then taken up in five drops of hydrochloric acid and the total volume adjusted in a 25-ml. volumetric flask with distilled water to make a solution containing approximately 1% hydrochloric acid. The solution used in these tests was otherwise as set forth in Example II.

In the several tests making up this example five 10-ml. portions of the solution prepared as aforesaid in this example were used in separate tests, and to these portions there were added respectively 0, 5, 10, 20 and 40 drops of hydrochloric acid, so that the five test samples had the following HCl concentrations respectively: 1%, 3.5%, 6%, 11% and 21% (by volume in each instance). To each of these solutions there were added ten drops of saturated $SO_2$ solution (of a concentration as given above) and all were titrated with potassium iodide as in Example II. It was found that the decolorizing of the respective solutions was generally inversely proportional to the HCl concentration therein; but in all cases the palladium iodide separated clearly and quantitatively and the detection of the end point offered no difficulties.

It was concluded, therefore, that the hydrochloric acid concentration of palladium-platinum solutions does not substantially affect the separation in accordance with this invention or the purity of the palladium as separated. It is necessary, however, that the solution in which the precipitation of the palladium iodide is carried on shall be acidic. It is believed that the upper pH limit is dependent upon the nature and amount of impurities present, the acidification of the solution with a strong acid such as hydrochloric acid serving to keep most impurities in solution, so that the palladium precipitate is maintained relatively pure. However, the acid concentration does appear to affect the stability of the platinum iodide complex in the absence of sulphur dioxide. For example, when an original standard solution containing 10 grams per liter of platinum and 5% of hydrochloric acid was diluted 100 times, reducing the acidity to 0.05% (approximately 0.006 N), tetravalent platinum iodide separated upon the addition of potassium iodide. Some platinum iodide was precipitated when the hydrochloric concentration was 1% (0.12–N), but none was observed at hydrochloric acid concentrations of 3% and above. However, in the presence of sulphur dioxide (according to the present invention), no platinum iodide separated even from a 0.1 gram per liter platinum solution containing only 0.05% hydrochloric acid.

*Example V*

This example is given to illustrate the effect of using strong acids other than hydrochloric acid, and particularly sulphuric and nitric acids.

In accordance with this example, a synthetic solution of palladium-platinum was made up as in Example II and five 10-ml. portions of that synthetic solution were placed in respective beakers. One of these was put aside for comparison purposes and the other four evaporated on a hot plate almost to dryness. In two of these four there was added 2-ml. each of nitric acid and into the other two 1-ml. each of sulphuric acid. This treatment was repeated twice more as to each sample by alternate evaporation and addition of acid respectively until these solutions were finally made up so that two samples of the four contained 20% nitric acid and two, 20% sulphuric acid, each in a total volume of 10-ml. Some difficulty was experienced in preparing palladium sulphate, as an insoluble residue formed which had to be filtered off. This made impossible the accurate separation of the palladium iodide from the sulphuric acid solution. However, palladium was separated (in a further test) from two mixed sulphuric-hydrochloric acid solutions, this palladium being only slightly more contaminated than palladium separated from hydrochloric acid solution alone.

One of the nitric acid solutions behaved in normal manner substantially as aforesaid (Example II), but the other remained red colored even after the stoichiometric amount of potassium iodide had been added. As this latter solution exihibited no smell of sulphur dioxide, a sulphur dioxide solution was added dropwise, which caused the precipitation of palladium iodide until all the palladium was precipitated and the solution appeared light green. It was assumed that the reason the palladium iodide solution to which the $SO_2$ had been added as aforesaid behaved differently from the other nitric acid solution was that it contained a small amount of hydrochloric acid. This supposition was later confirmed by preparing two palladium nitrate-nitric acid solutions, one of which had no hydrochloric acid therein, while the other contained a small amount of HCl intentionally left therein. The sample having no hydrochloric acid acted normally in accordance with the present invention; whereas the one having the small amount of hydrochloric acid therein required the addition of an excess amount of sulphur dioxide to assure complete precipitation of the palladium.

*Example VI*

Tests have also been made to determine the effect of an excess of a soluble iodide over the stoichiometric amount which would be introduced in a normal titration. In general, this effect is not critical and the avoidance of an excess of iodide is more a matter of economy than otherwise. However, in the event that the solution contains a minimum or close to a minimum amount of sulphur dioxide, an excess of iodide might have the effect of creating a deficiency in sulphur dioxide with the troubles attendant thereto as aforesaid. This is believed to be due to the fact that the iodine liberated incident to the presence of an excess of soluble iodide serves to oxidize sulphur dioxide to sulphur trioxide or sulphate. For this reason, therefore, it is normally the intent in accordance with the present invention to avoid an excess of iodide.

In this connection it is noted that while potassium iodide has been used in all the examples, other water-soluble iodides, including sodium iodide, could be used as the important element to introduce iodide ions into the solution.

*Example VII*

The purpose of this example is to show the effect on the process of different ratios of palladium to platinum, it being noted that in the tests hereinabove described, a ratio of 7:1 was used. In this example the following ratios of these two materials were used in a series of tests: 7:1, 4:1, 2:1, 4:3, 1:1, 1:7 and 1:19. In each of these solutions the ratio given is a weight ratio of palladium to platinum, both calculated as metals and the palladium and platinum both being present as chlorides in a solution containing about 10% to about 15% by volume hydrochloric acid and about 3% to about 5% by volume of saturated sulphur dioxide solution. Thus, as to these other ingredients the compositions were in the preferred ranges of this invention. The precipitation was carried on as set forth in greater detail in Example II and the palladium precipitated (in a single precipitation) and recovered as there stated.

It was found that the palladium in each instance was quantitatively precipitated from all the several test examples. The contamination of palladium by platinum increased, however, as the proportion of palladium in the various mixtures decreased. Specifically, in the mixtures having a ratio of palladium to platinum of 7:1 and 4:1, the amount of platinum remaining with the palladium was only a trace. In the mixture having an initial proportion of 2:1 there was about 1% platinum with the palladium; while in the 4:3, 1:1, 1:7 and 1:19 initial mixtures there was respectively 2.5%, 5%, 60% and 100% contamination of the recovered palladium by platinum.

Thus it will be seen that single precipitation is adequate when there is at least about 4:1 ratio of palladium to platinum. For mixtures down to about 1:1 ratio palladium to platinum, a second precipitation is sufficient to effect a substantially complete separation of these metals; while mixtures containing less than about 1:1 palladium to platinum require three or more precipitations to get substantially complete separation of these metals.

Subsequent precipitations in each instance may be effected as follows: after the palladium, with whatever contamination of platinum is present therein, is recovered as metal as aforesaid, this metal is redissolved in aqua regia, it being noted at this point that both palladium and platinum are soluble in aqua regia; while rhodium and iridium are not soluble. The solution in aqua regia is then treated repeatedly by alternate evaporation to reduce its volume and by the addition of hydrochloric acid, so as to eliminate the nitric acid therefrom and to bring the palladium and platinum into solution as chlorides in an aqueous hydrochloric acid solution. This solution, with a sufficient amount of hydrochloric acid present therein as aforesaid to render the process operable, is then provided with a sufficient concentration of sulphur dioxide as by adding a saturated solution thereof or by bubbling gaseous $SO_2$ therethrough. A second precipitation is then carried on, which is preferably done exactly as was the first precipitation by titrating the palladium present with a soluble iodide, such as potassium iodide. It will be seen that the result of the first precipitation will have a much more favorable ratio of palladium to platinum than the original solution, so that the second precipitation will yield either substantially pure palladium or palladium with a greatly reduced platinum content as the case may be.

*Example VIII*

This example is given to illustrate the application of the process in separating palladium from rhodium and from iridium, it being recognized that the examples given above were generally restricted to the separation of palladium and platinum.

In testing the efficiency of the process in separating palladium and rhodium, three synthetic solutions, all as chlorides, were prepared, the first containing 6 grams of palladium and 1 gram of rhodium per liter; the second containing 6 grams of palladium and 2 grams of rhodium per liter; and the third, 6 grams of palladium, 1 gram of rhodium and 1 gram of platinum per liter. In each instance the purity of palladium separated by the process as particularly set out above was very satisfactory; although the contamination of palladium by rhodium was generally somewhat higher than in the case of platinum as above set out. However, the same principles apply and the required reprecipitation must be carried out in instances where the rhodium is somewhat lower in proportion than in the case of platinum, the limits of which have been given in Example VII.

The same pattern was followed in testing the separation of palladium from iridium as in the case of rhodium. In this case, three synthetic solutions were prepared, the first containing 6 grams of palladium and 1 gram of iridium per liter; the second containing 6 grams of palladium and 2 grams of iridium per liter; and the third, 6 grams of palladium, 1 gram of platinum and 1 gram of iridium per liter. The tests were made substantially as set out in detail in Example II. The recovery and purity of the palladium derived from these three solutions by the method of the present invention were eminently satisfactory. The contamination of the recovered palladium by iridium was very slight in each instance, and was of the same order as the contamination of palladium by platinum as set forth hereinabove.

While there is herein shown and described but one principal process; and the variations within which the invention may be practiced have been set out in considerable detail and proven by actual examples, other variations and equivalents will occur to those skilled in the art from the foregoing disclosure. I do not wish to be limited, therefore, except by the scope of the appended claims, which are to be construed validly as broadly as the state of the prior art permits.

What is claimed is:

1. In the process of separating palladium from metals of the platinum group, said group consisting of platinum, rhodium and iridium, said process starting with an aqueous solution of compounds of palladium and of at least one metal of said platinum group, and in which said aqueous solution is maintained in an acid condition by the presence therein of at least one strong acid, but in which said aqueous solution is substantially free of aqua regia; said process comprising the steps of adding a water-soluble iodide to said aqueous solution in an amount at least stoichiometrically equivalent to the palladium present to form $PdI_2$, so as to precipitate the palladium quantitatively as $PdI_2$; and meanwhile maintaining in said aqueous solution a sufficient concentration of sulphur dioxide so as (a) to prevent the solution of $PdI_2$ by conversion thereof to $PdI_4^=$, and (b) to retard the precipitation of iodine-containing compounds of metals of said platinum group; so that the resulting precipitate will contain substantially all the palladium initially present in said aqueous solution and an amount of the metals of said platinum group (in compound form) substantially less than was present in said aqueous solution.

2. The process in accordance with claim 1, in which said strong acid is an acid selected from the group consisting of hydrochloric acid and nitric acid.

3. The process in accordance with claim 1, in which said strong acid is hydrochloric acid.

4. The process in accordance with claim 1, in which said strong acid is a mixture of hydrochloric acid and sulphuric acid.

5. The process in accordance with claim 1, in which the concentration of sulphur dioxide which is maintained in said aqueous solution is at least about 0.3 gram per liter.

6. The process in accordance with claim 1, in which the concentration of sulphur dioxide which is maintained in said aqueous solution is in the range of about 0.3 gram per liter to about 4 grams per liter.

7. The process in accordance with claim 1, in which the concentration of sulphur dioxide which is maintained in said aqueous solution is in the range of about 1 gram per liter to about 3 grams per liter.

8. The process in accordance with claim 1, in which the water-soluble iodide is added in an amount which is substantially stoichiometrically equivalent to the palladium present to form $PdI_2$, the soluble iodide being added by titration to a visible end point.

9. The process in accordance with claim 1, in which said strong acid is principally hydrochloric acid but also includes a relatively small amount of nitric acid, said process under these conditions including the step of providing a sufficient excess amount of sulphur dioxide in said aqueous solution to assure the quantitative amount of palladium and to provide a definite ascertainable end point for determining when the stoichiometric precipitation of water-soluble iodide has been added.

10. The process of substantially quantitatively separating palladium from at least one of the metals of the platinum group, said group consisting of platinum, rhodium and iridium, in the treatment of an aqueous solution of compounds of palladium and of at least one metal of said platinum group, in which there is a weight ratio of palladium to the metals of said platinum group (calculated as metals) of at least 4:1, and in which said solution is maintained in an acid condition by the presence therein of at least one strong acid, but wherein said solution is substantially free of aqua regia; said process comprising the steps of adding a water-soluble iodide to said aqueous solution in an amount at least stoichiometrically equivalent to the palladium present to form $PdI_2$, so as to precipitate the palladium quantitatively as $PdI_2$, and meanwhile maintaining in said aqueous solution a sufficient concentration of sulphur dioxide so as substantially completely to prevent the solution of $PdI_2$ by conversion thereof to $PdI_4^=$ and to prevent the precipitation of iodine-containing compounds of the metals of said platinum group.

11. The process of substantially quantitatively separating palladium from at least one of the metals of the platinum group, said group consisting of platinum, rhodium and iridium, in the treatment of an aqueous solution of compounds of palladium and of at least one metal of said platinum group, in which there is a weight ratio of palladium to the metals of said platinum group (calculated as metals) of less than about 4:1, and in which said solution is maintained in an acid condition by the presence therein of at least one strong acid, but wherein said aqueous solution is substantially free of aqua regia; said process comprising the steps of precipitating the palladium therein by adding a water-soluble iodide to said aqueous solution in an amount which is about stoichiometrically equivalent to the palladium present to form $PdI_2$, so as to precipitate the palladium quantitatively as $PdI_2$; and meanwhile maintaining in said solution a sufficient concentration of sulphur dioxide so as (a) to prevent the solution of $PdI_2$ by conversion thereof to $PdI_4^=$, and (b) to retard the precipitation of iodine-containing compounds of the metals of said platinum group; separating the precipitate thus formed from the remaining liquid, igniting the separated precipitate to drive off iodine and to reduce it to the corresponding metals, redissolving at least the palladium and platinum present of said metals resulting from the igniting step in aqua regia, while leaving any rhodium and iridium undissolved, separating the redissolved metals from any remaining precipitate to give a solution including the chlorides of palladium and platinum, eliminating the nitric acid present in the solution by successively and alternately reducing the volume of the solution to a minimum by evaporation and taking up the remaining minimum in hydrochloric acid, reestablishing in the solution so prepared a concentration of sulphur dioxide in the range of about 0.3 gram per liter to about 4 grams per liter; and reprecipitating palladium as $PdI_2$, by adding a soluble iodide, so as to repeat the palladium precipitation step as aforesaid; and repeating the solution in aqua regia and the subsequent steps as stated and subsequent precipitation of $PdI_2$, all as aforesaid as often as necessary to get a substantially quantitative separation of palladium and platinum.

12. The process in accordance with claim 11, wherein in the starting material, the weight ratio of palladium to the metals of said platinum group (considered as metals) is at least about 1:1, said process comprising a single redissolving of the metal remaining after ignition in aqua regia and a single subsequent reprecipitation.

13. The process in accordance with claim 11, wherein in the starting material there is a weight ratio of palladium to the metals of said platinum group (considered as metals) of as little as 1:19, said process comprising two redissolvings of the metal remaining after ignition and resulting from a former precipitation, and two reprecipitations of the palladium as $PdI_2$.

No references cited.

UNITED STATES PATENT OFFICE

CERTIFICATE OF CORRECTION

Patent No. 2,875,040                                            February 24, 1959

Silvio Barabas

It is hereby certified that error appears in the printed specification of the above numbered patent requiring correction and that the said Letters Patent should read as corrected below.

Column 10, line 69, for "amount" read -- precipitation --; lines 71 and 72, for "precipitation" read -- amount --.

Signed and sealed this 2nd day of June 1959.

(SEAL)
Attest:

KARL H. AXLINE
Attesting Officer

ROBERT C. WATSON
Commissioner of Patents